United States Patent
Nemeth et al.

(10) Patent No.: US 10,994,709 B2
(45) Date of Patent: May 4, 2021

(54) SYSTEM FOR DRIVERLESS OPERATION OF UTILITY VEHICLES

(71) Applicant: KNORR-BREMSE SYSTEME FUER NUTZFAHRZEUGE GMBH, Munich (DE)

(72) Inventors: Huba Nemeth, Budapest (HU); Peter Frank, Budapest (HU); Csaba Horvath, Biatorbagy (HU)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 183 days.

(21) Appl. No.: 16/329,556

(22) PCT Filed: Aug. 16, 2017

(86) PCT No.: PCT/EP2017/070743
§ 371 (c)(1),
(2) Date: Feb. 28, 2019

(87) PCT Pub. No.: WO2018/046260
PCT Pub. Date: Mar. 15, 2018

(65) Prior Publication Data
US 2019/0256061 A1   Aug. 22, 2019

(30) Foreign Application Priority Data
Sep. 8, 2016 (DE) .................... 10 2016 116 861.0

(51) Int. Cl.
*B60T 7/12* (2006.01)
*B60T 13/68* (2006.01)
(Continued)

(52) U.S. Cl.
CPC .................................... *B60T 7/12* (2013.01);
*B60T 7/18* (2013.01); *B60T 7/20* (2013.01);
*B60T 7/22* (2013.01);
(Continued)

(58) Field of Classification Search
CPC .......... B60T 7/12; B60T 17/22; B60T 13/662;
B60T 7/18; B60T 7/22; B60T 7/20;
(Continued)

(56) References Cited

U.S. PATENT DOCUMENTS

2005/0029864 A1* 2/2005 Bauer .................. B60T 13/662
303/191
2010/0252378 A1* 10/2010 Hilberer ................ B60T 13/683
188/106 F
(Continued)

FOREIGN PATENT DOCUMENTS

CN   102991483 A   3/2013
CN   103661364 A   3/2014
(Continued)

OTHER PUBLICATIONS

International Search Report dated Dec. 1, 2017 of the corresponding International Application PCT/EP2017/070743 filed Aug. 16, 2017.

*Primary Examiner* — Sze-Hon Kong
(74) *Attorney, Agent, or Firm* — Norton Rose Fulbright US LLP; Gerard Messina

(57) ABSTRACT

A system for providing driverless operation of a utility vehicle in a limited area, including: a control module to output a valid autonomous control signal to an electropneumatic parking brake system and to control the utility vehicle in a driverless manner, wherein the utility vehicle allows an autonomous operating mode and includes the electropneumatic parking brake system which is configured to release the parking brake system when the valid autonomous control signal is present and to initiate automatic emergency braking when no valid autonomous control signal is applied; and a transfer module to transfer control of the utility vehicle from the driver to the control module. Also described are a related method and computer readable medium.

7 Claims, 3 Drawing Sheets

Figure 1:
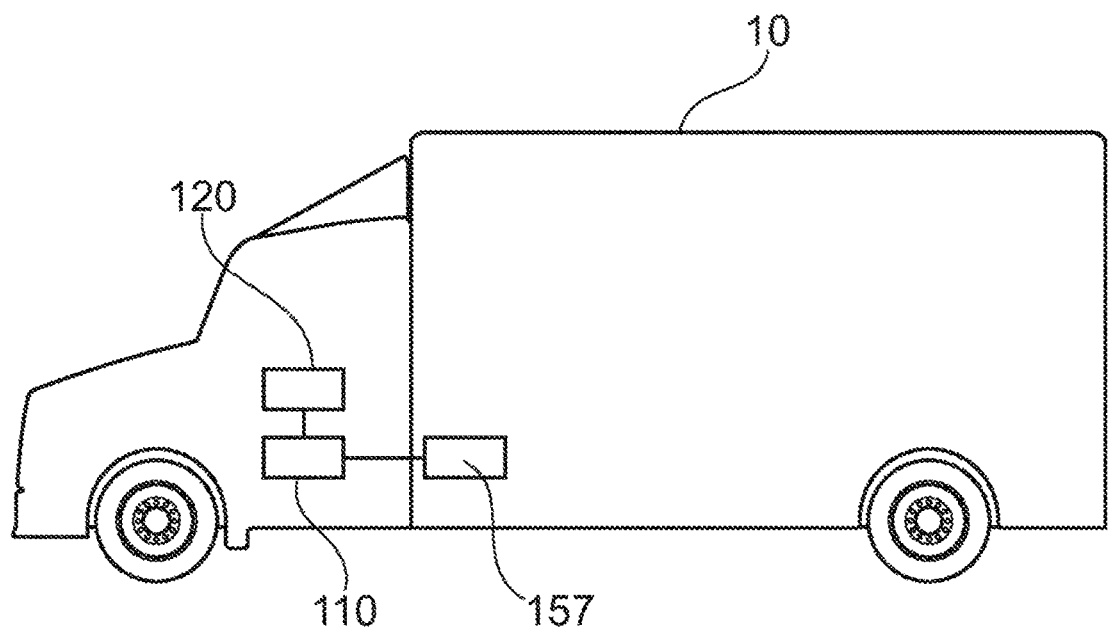

(51) Int. Cl.
*G05D 1/00* (2006.01)
*B60T 17/22* (2006.01)
*B60T 13/66* (2006.01)
*B60T 7/18* (2006.01)
*B60T 7/22* (2006.01)
*B60T 7/20* (2006.01)

(52) U.S. Cl.
CPC .......... *B60T 13/662* (2013.01); *B60T 13/683* (2013.01); *B60T 17/22* (2013.01); *G05D 1/0055* (2013.01); *G05D 1/0088* (2013.01); *B60T 2201/022* (2013.01); *B60T 2260/02* (2013.01); *B60T 2270/40* (2013.01); *B60T 2270/89* (2013.01); *G05D 2201/0212* (2013.01); *G05D 2201/0213* (2013.01)

(58) Field of Classification Search
CPC .............. B60T 13/683; B60T 2260/02; B60T 2201/022; B60T 2270/40; B60T 2270/89; G05D 1/0055; G05D 1/0088; G05D 2201/0212; G05D 2201/0213
See application file for complete search history.

(56) References Cited

U.S. PATENT DOCUMENTS

| | | | |
|---|---|---|---|
| 2014/0048104 A1* | 2/2014 | Stadler | B60S 3/04 134/18 |
| 2016/0273922 A1* | 9/2016 | Stefan | G06Q 10/00 |
| 2017/0066420 A1* | 3/2017 | Leinung | B60T 7/20 |
| 2017/0307080 A1* | 10/2017 | Bormann | B60T 1/005 |
| 2019/0039604 A1* | 2/2019 | Auracher | G05D 1/0225 |
| 2019/0248349 A1* | 8/2019 | Wulf | B60T 8/94 |
| 2019/0248350 A1* | 8/2019 | Wulf | B60T 13/683 |
| 2019/0337503 A1* | 11/2019 | Otremba | B60T 8/1708 |

FOREIGN PATENT DOCUMENTS

| | | |
|---|---|---|
| CN | 104442820 A | 3/2015 |
| CN | 104442821 A | 3/2015 |
| DE | 10146770 A1 | 4/2003 |
| EP | 2998177 A1 | 3/2016 |
| ES | 2436845 A2 | 1/2014 |
| FR | 2893499 A1 | 5/2007 |
| WO | 2006071169 A1 | 7/2006 |
| WO | 2014051890 A1 | 4/2014 |
| WO | 2014148980 A1 | 9/2014 |

* cited by examiner

SYSTEM FOR DRIVERLESS OPERATION OF UTILITY VEHICLES

FIELD OF THE INVENTION

The present invention relates to a system and a method for driverless operation of utility vehicles and in particular to an architecture of utility vehicles for autonomous operation in a limited area.

BACKGROUND INFORMATION

The autonomous operation of transport vehicles or of other utility vehicles is increasingly gaining interest, even though many open problems frequently do not yet permit safe operation. The technical complexity of the basic problem is, however, simplified in regions where disruptive influences can be kept low and the vehicle speeds are limited. Although some applications of driverless operations of utility vehicles are already possible, there is a further need for automated or semi-automated operations and in particular for environments where such operations can be carried out.

In addition, in the use of utility vehicles, the transport time and the utilization of the working time of the driver are significant factors for the effectiveness of a vehicle fleet.

The main part of the transport is typically done on public roads with standardized rules, which frequently do not represent high requirements on the driver. However, problems can occur when the utility vehicle is used in specific areas where the environment is unique, the space is limited but nevertheless specific maneuvers have to be carried out, which frequently place high requirements on the driver. In addition, the effectiveness of the vehicle fleet decreases or the number of accidents increases when, in specific, non-standardized areas, drivers carry out maneuvers which are associated with increased difficulties and therefore need more time.

In order to ensure a high degree of safety during the autonomous operation of vehicles, it is necessary that the vehicle can always be brought to a safe state. The vehicle should in no case move in an uncontrolled manner.

The previously known solutions are believed to be inadequate in order to achieve a high level of safety during the autonomous driving of utility vehicles in a limited area. Therefore, there is a need for further systems for the operation of utility vehicles.

SUMMARY OF THE INVENTION

At least some of the aforementioned problems may be solved by a system for operating a utility vehicle as described herein, a utility vehicle as described herein and a method as described herein. The further descriptions herein define further advantageous embodiments.

The present invention relates to a system for driverless operation of a utility vehicle in a limited area. The utility vehicle allows an autonomous operating mode and comprises an electropneumatic parking brake which is configured to release the parking brake when a valid autonomous control signal is present and to initiate automatic emergency braking when no valid autonomous control signal is applied. The system comprises a control module, which is configured to output the valid autonomous control signal to the electropneumatic parking brake and to control the utility vehicle in a driverless manner; and a transfer module, which is configured to transfer control of the utility vehicle from the driver to the control module.

The term "operate" is intended to cover all activities which the driver otherwise carries out and, for example, comprise driving, steering, braking and accelerating. The term "driverless" in particular means that the driver is not present in the vehicle.

Within the context of the present invention, a limited area is intended to cover all areas in which regulation is present, in that, for example, access control (e.g. for persons) is carried out and there is a restriction with regard to vehicle movements. A limited area is therefore intended in particular to cover areas such as, for example, loading bays, loading and unloading stations, ferries, aircraft, ships, rail transports and many more. Optionally, the entrance and the exit can be situated at the same location or only represent different lanes of an access.

Optionally, the system also comprises a checking module, which is configured to establish whether a driver is present in the utility vehicle. The transfer module is thus configured to transfer the control of the utility vehicle to the control module only when the checking module has established that no driver is present in the utility vehicle. This can be, for example, a condition for the limited area which must be satisfied.

The electropneumatic parking brake can have the following components: a bistable valve for activating the autonomous operating mode and a monostable valve which, in the stable state, automatically initiates emergency braking in the absence of the valid control signal. In this case, the transfer module can be coupled to the bistable valve in order to switch the bistable valve to the autonomous operating mode when the control of the utility vehicle is transferred from the driver to the control module. This valve can, for example, be actuated by the driver. In addition, the control module can be configured to transmit the valid autonomous control signal to the monostable valve in order to move the monostable valve into a non-stable state, which prevents the emergency braking of the utility vehicle. If, for any reason, the autonomous control signal remains absent, the monostable valve will thus automatically change to the stable state and initiate the emergency braking.

Optionally, the transfer module can provide an interface for a driver of the utility vehicle, in order to trigger the transfer. As a result, the bistable valve can be actuated.

The utility vehicle can have at least one of the following components: a torque-controlled additional steering device, a communication control device, a position determining device, an environment sensor device and an electronic trailer brake system. Optionally, the control module can be configured to check functional readiness of the components and, on the basis of the check, to take over the control of the utility vehicle and to output the autonomous control signal.

The present invention also relates to a utility vehicle having a system as has been described previously and which can have the aforementioned components.

A further exemplary embodiment relates to a system which is suitable for a commercial utility vehicle and/or a vehicle combination, wherein the vehicle comprises an electropneumatic service brake, the electropneumatic parking brake, a superimposed torque steering system, a communication control unit and an autonomous driving control unit (e.g. the control module) and, in particular, is operated autonomously in the limited area where the entrance and the exit are restricted. A driver is not present in the vehicle. The safe state of the vehicle is ensured by the emergency activation of the parking brake in the event of a malfunction.

If the parking brake allows a bistable operating mode and a further monostable operating mode, the system can operate the parking brake on public roads in a stable driving mode (e.g. with deactivated parking brake) as part of the bistable operating mode. The emergency braking of the parking brake system can, as already stated, be ensured by the monostable operating mode.

In the system, the emergency braking of the parking brake system can furthermore be avoided or suppressed by activation of an autonomous control signal in the normal, autonomous driving mode in the closed or limited area. In the system, the emergency braking of the parking brake system can additionally be ensured by deactivation of the control signal in the monostable operating mode.

Exemplary embodiments of the present invention offer the advantage of using the transport time and the working time of the driver effectively and, at the same time, of reducing the probability of accidents in a limited area, in which specific activities are carried out on the vehicle. The activities include, in addition to moving the utility vehicle, for example loading and unloading, maintenance, refueling, cleaning of the utility vehicle or else transporting the utility vehicle by an external arrangement (for example on ferries, trains or aircraft).

According to exemplary embodiments, the presence of the driver in the utility vehicle is not necessary. Moreover, the driver does not need to be or must not be present in the utility vehicle. It is therefore possible to achieve the situation in which as few persons as possible are in the limited area and thus a high level of safety is achieved. The activities which are otherwise carried out by a driver are replaced and carried out by an autonomous vehicle movement system.

The present invention also relates to a method for driverless operation of a utility vehicle in a limited area. The utility vehicle allows an autonomous operating mode and comprises an electropneumatic parking brake system, which is configured to release the parking brake system when a valid autonomous control signal is present and to initiate automatic emergency braking when no valid autonomous control signal is applied. The method comprises the steps:
transferring control of the utility vehicle from a driver of the utility vehicle to a control module;
outputting the valid autonomous control signal to the electropneumatic parking brake system; and
moving the utility vehicle in a driverless manner.

This method can likewise be implemented or stored in the form of instructions in software or on a computer program product, wherein stored instructions are capable of executing the steps according to the method if the method runs on a processor (e.g. one of the vehicle control units). Therefore, the present invention likewise relates to a computer program product having software code (software instructions) stored thereon, which is configured to carry out one of the previously described methods when the software code is executed by a processing unit. The processing unit can be any form of computer or control unit and likewise comprise the described control module or the warning module control system which have an appropriate microprocessor which can execute software code.

The exemplary embodiments of the present invention will be understood better from the following detailed description and the appended drawings of the different exemplary embodiments, which are however not intended to be understood such that they restrict the disclosure to the specific embodiments but merely serve for clarification and understanding.

BRIEF DESCRIPTIONS OF THE DRAWINGS

Figure 2:
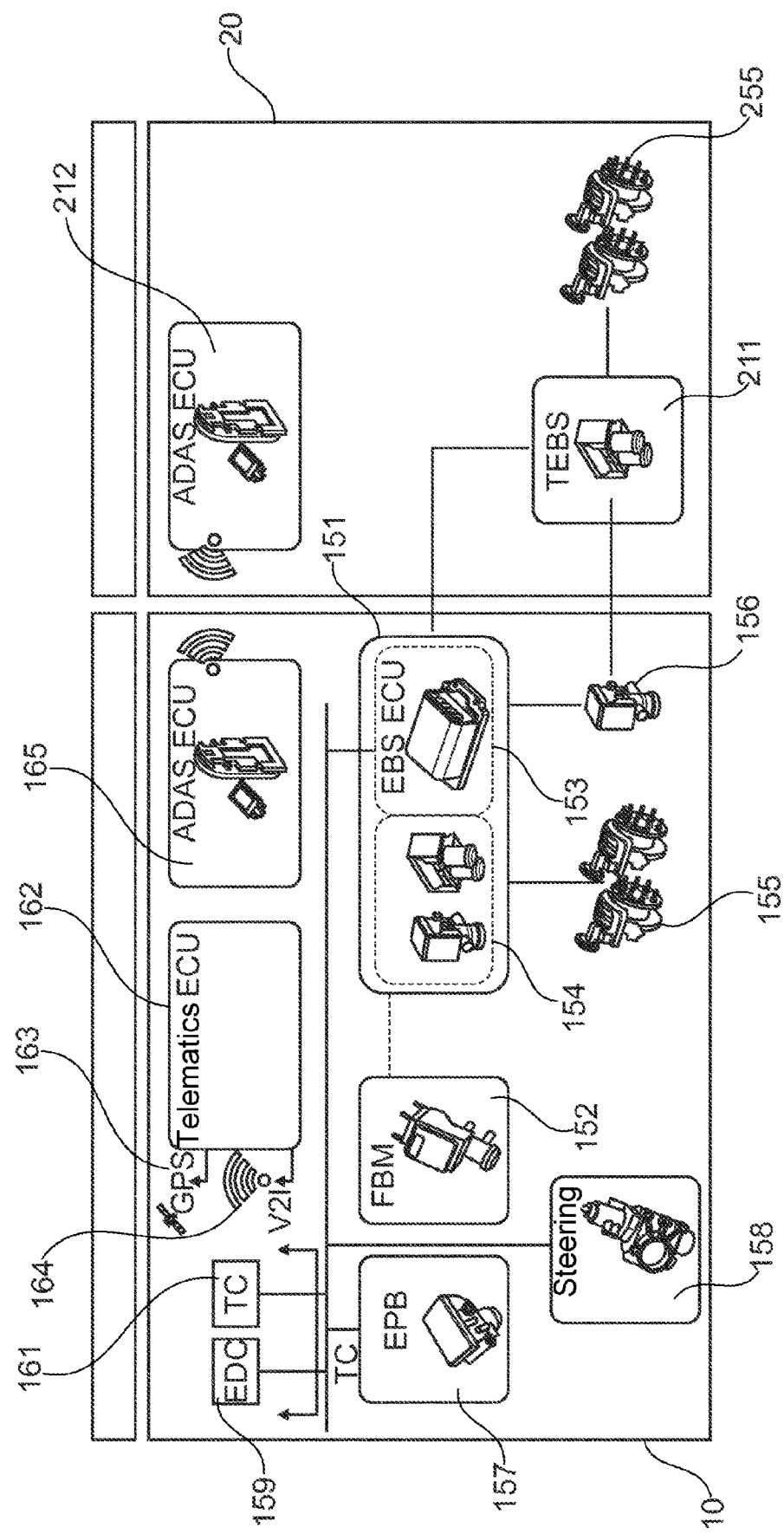
Figure 3:
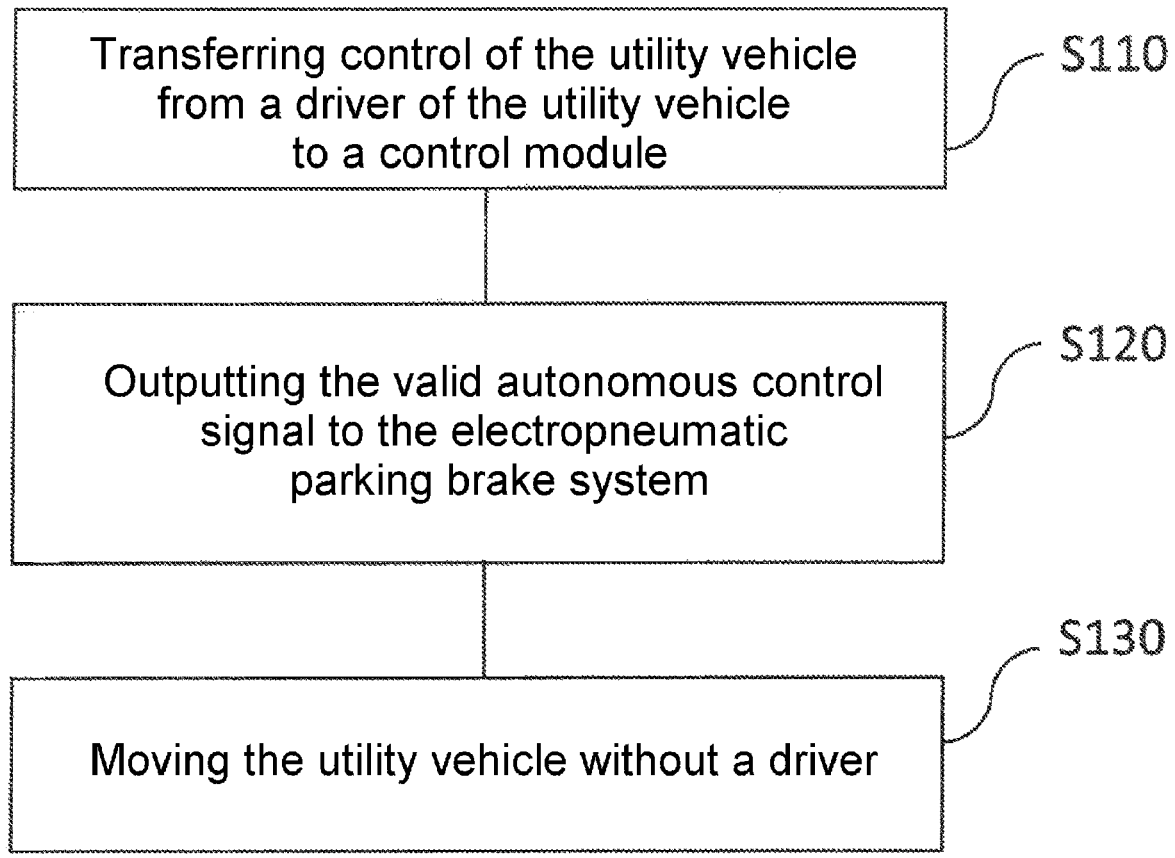

FIG. 1 shows a system for operating a utility vehicle in a limited area.
FIG. 2 shows an exemplary system architecture of a utility vehicle or vehicle combination.
FIG. 3 shows a flowchart of a method for moving a utility vehicle in a driverless manner in a limited area.

DETAILED DESCRIPTION

FIG. 1 shows a system according to one exemplary embodiment of the present invention, which is suitable for operating a utility vehicle 10 in a driverless manner in a limited area. The utility vehicle 10 allows an autonomous operating mode and comprises an electropneumatic parking brake 157, which is configured to release the parking brake 157 when a valid autonomous control signal is present and to initiate automatic emergency braking when no valid autonomous control signal is applied. The system comprises a control module 110 and a transfer module 120. The control module 110 is configured to output the valid autonomous control signal to the electropneumatic parking brake 157 and to control the utility vehicle 10 in a driverless manner. The transfer module 120 is configured to transfer control of the utility vehicle 10 from the driver to the control module 110.

In order to ensure the driverless operation of the utility vehicle at low speeds, the utility vehicle thus comprises an architecture which, in the event of failure or operational disruptions, automatically initiates a safety mechanism. According to exemplary embodiments, the utility vehicle is stopped automatically in the event of any malfunction. For this purpose, appropriate detection modules which are suitable for establishing malfunctions can be provided. In the event of the detection of a malfunction, said detection modules can arrange for the control module 110 not to output any valid autonomous control signal. Exemplary embodiments achieve this by an electropneumatic parking brake which then (i.e. in the event of disruptions) carries out an emergency stop and thus ensures a safe state.

FIG. 2 shows an exemplary system architecture of a utility vehicle 10, 20 which can be used for a closed or limited area for driverless operation. The utility vehicle comprises a tractor 10 and a trailer 20. The tractor 10 is equipped with an electropneumatic service brake 151, which can be controlled by a foot brake module (FBM) 152. The braking instructions from the foot brake module (FBM) 152 are processed by a central brake control unit (EBS ECU) 153, which activates electropneumatic brake modules 154. Finally, the wheel brake actuators 155 are supplied with appropriate brake pressures in order to achieve the desired braking action.

In addition, the tractor 10 comprises a trailer control module 156, which activates the brake system of the trailer 20. The system of the tractor 10 also comprises a specific electropneumatic parking brake system (EPB) 157. This system can, for example, be formed as a modulator and allows a bistable operating mode. The electropneumatic parking brake system 157 additionally comprises a monostable operating mode, which is activated if the parking brake is not activated in a valid way (i.e. when no valid autonomous control signal is applied), which thus leads to a vehicle stop. This monostable operating mode can, for example, can be used for driverless vehicle operation in the closed or limited areas such as, for example, loading bays.

In order to prevent the vehicle being stopped during the normal autonomous operation, the electropneumatic parking brake system 157 is configured to prevent deactivation of the monostable operating mode as long as a valid autonomous control signal is applied. This can be done by appropriate valves, which control the pneumatic pressure on the brake actuators. Therefore, according to exemplary embodiments, an emergency stop is carried out by the electropneumatic parking brake system 157 only when no valid autonomous control signal is applied (for example as a result of a fault, a power failure or any other disruption). For this purpose, as already mentioned, a detection model can be provided, which detects potential faults and, on this basis, prevents the output of a valid autonomous control signal.

In addition, the system of the tractor 10 comprises a steering module 158, which is configured to carry out a steering movement in a driverless state. This can be done, for example, by exerting asymmetrical torques on the steered wheels. The vehicle also comprises an engine control unit (EDC) 159 for an exemplary diesel engine control or a similar control unit for an electric drive motor. In addition, the tractor 10 comprises, by way of example, a control unit 161 for monitoring the transmission system (TC, transmission control), which is configured to also control the clutch and/or the transmission in the driverless operating mode.

Optionally, the tractor 10 comprises an electronic control unit 162 for a telematics system. This can optionally be coupled to position sensors 163 in order to provide position information for the vehicle (for example by using GPS information). For this purpose, for example, a standard GPS or a differential GPS for highly accurate positions can be used. This control unit 162 can likewise comprise a communication unit 164 between the autonomous vehicle and a mobile device which is optionally possessed by the driver or an operator of the limited area, in order to communicate with the vehicle or to transmit data (e.g. route information).

Finally, the system of the tractor 10 comprises an automated driving control unit (ADAS) 165, which receives signals from one or more sensors which can perform environment detection. Such sensors can comprise, for example, radar units, a camera, a LIDAR or ultrasonic sensors or a combination thereof. This driving control unit 165 processes and monitors the complete driverless operation of the utility vehicle 10 or the combination of the utility vehicle 10 and the trailer 20 in the limited area. Furthermore, this control unit 165 can activate or monitor the different actuators of the vehicle 10. These include, for example, a steering device, the service brake, the parking brake, the engine control unit. The control module 110 can, for example, be part of this driving control unit 165. The control module 110 can, for example, be implemented via software in the driving control unit 165 (or another control unit), wherein the installed software provides the appropriate functions of the control module 110. Likewise, the transfer module 120 can be implemented via installed software in an existing control unit.

The trailer 20 comprises a trailer electronic brake system (TEBS) 211, which is activated by the trailer control module 156 of the brake system of the tractor 10 and actuates brake actuators 255 of the trailer 20. In addition, the trailer 20 comprises an ADAS control unit 212 which, for example, is configured to collect and pre-process signals from environment sensors and to transmit the same to the ADAS 163 of the tractor 10, in order therein to thus draw the appropriate conclusions therefrom.

Thus, FIG. 2 discloses an architecture for a utility vehicle combination comprising a tractor 10 and a trailer 20, which is suitable for an autonomous driving mode at low speed in a closed or limited area.

FIG. 3 shows a flowchart of a method for driverless movement (or operation) of a utility vehicle 10 in a limited area. The utility vehicle 10 allows an autonomous operating mode and comprises an electropneumatic parking brake system 157, which is configured to release the parking brake system 157 when a valid autonomous control signal is present and to initiate automatic emergency braking when no valid autonomous control signal is applied. The method comprises the steps:

transferring S110 control of the utility vehicle 10 from a driver of the utility vehicle 10 to a control module 110;
outputting S120 the valid autonomous control signal to the electropneumatic parking brake system 157; and
moving S130 the utility vehicle 10 without a driver.

The method or at least parts thereof can likewise be computer-implemented, i.e. it can be implemented by instructions which are stored on a storage medium and which are capable of carrying out the steps of the method when it runs on a processor. The instructions typically comprise one or more instructions which can be stored in a different way on different media, in or peripherally to a control unit (having a processor), which, when they are read and executed by the control unit to arrange for the control unit to execute functions, functionalities and operations which are necessary to carry out a method according to the present invention.

The features of the invention disclosed in this description, the claims and the figures can be essential to the implementation of the invention, both individually and in any desired combination.

THE LIST OF DESIGNATIONS IS AS FOLLOWS

10 Tractor
20 Trailer
110 Control module
120 Transfer module
130 Checking module
151 Electropneumatic service brake (EPB)
152 Foot brake module (FBM)
153 Central brake control unit (EBS ECU)
154 Electropneumatic brake modules
155, 255 Wheel brake actuators
156 Trailer control module
157 Electropneumatic parking brake system (EPB)
158 Steering module
159 Engine control unit (EDC)
161 Control unit for monitoring the transmission system (TC)
162 Electronic control unit
163 Position sensors
164 Communication unit
165 Driving control unit (ADAS)
211 Trailer electronic brake system (TEBS)
212 ADAS control unit (Trailer)

The invention claimed is:

1. A system for providing driverless operation of a utility vehicle in a limited area, comprising:
a control module to output a valid autonomous control signal to an electropneumatic parking brake system and to control the utility vehicle in a driverless manner, wherein the utility vehicle allows an autonomous operating mode and includes the electropneumatic parking brake system which is configured to release the parking brake system when the valid autonomous control signal is present and to initiate automatic emergency braking when no valid autonomous control signal is applied; and a transfer module to transfer control of the utility vehicle from the driver to the control module;

wherein the electropneumatic parking brake system includes a bistable valve which is activatable in the autonomous operating mode and a monostable valve which, in the stable state, automatically initiates emergency braking when the valid autonomous control signal has not been applied, wherein the transfer module is coupled to the bistable valve to switch the bistable valve in the autonomous operating mode when the control of the utility vehicle is transferred from the driver to the control module, and wherein the control module is configured to transmit the valid autonomous control signal to the monostable valve to move the monostable valve into a non-stable state, which prevents the emergency braking of the utility vehicle.

2. The system of claim 1, further comprising:

a checking module to establish whether a driver is present in the utility vehicle;

wherein the transfer module is configured to transfer the control of the utility vehicle to the control module only when the checking module has established that no driver is present in the utility vehicle.

3. The system of claim 1, wherein the transfer module provides an interface for a driver of the utility vehicle to trigger the transfer.

4. The system of claim 1, wherein the utility vehicle includes at least one of the following components: a torque-controlled steering device, a communication control device, a position determining device, an environment sensor device, an electronic trailer brake system, wherein the control module is configured to check functional readiness of the components and, based on the check, to take over the control of the utility vehicle to control the utility vehicle in a driverless manner.

5. A utility vehicle, comprising:

an electropneumatic parking brake system, which is configured to release the parking brake system when a valid autonomous control signal is present and to initiate automatic emergency braking when no valid autonomous control signal is applied;

a system for providing driverless operation of the utility vehicle in a limited area, including:

a control module to output a valid autonomous control signal to the electropneumatic parking brake system and to control the utility vehicle in a driverless manner, wherein the utility vehicle allows an autonomous operating mode and includes the electropneumatic parking brake system which is configured to release the parking brake system when the valid autonomous control signal is present and to initiate automatic emergency braking when no valid autonomous control signal is applied; and a transfer module to transfer control of the utility vehicle from the driver to the control module;

wherein the electropneumatic parking brake system includes a bistable valve which is activatable in the autonomous operating mode and a monostable valve which, in the stable state, automatically initiates emergency braking when the valid autonomous control signal has not been applied, wherein the transfer module is coupled to the bistable valve to switch the bistable valve in the autonomous operating mode when the control of the utility vehicle is transferred from the driver to the control module, and wherein the control module is configured to transmit the valid autonomous control signal to the monostable valve to move the monostable valve into a non-stable state, which prevents the emergency braking of the utility vehicle.

6. A method for providing driverless operation of a utility vehicle in a limited area, the method comprising:

transferring control of the utility vehicle from a driver of the utility vehicle to a control module, wherein the utility vehicle allows an autonomous operating mode and includes an electropneumatic parking brake system configured to release the parking brake system when a valid autonomous control signal is present and to initiate automatic emergency braking when no valid autonomous control signal is applied;

outputting the valid autonomous control signal to the electropneumatic parking brake system; and moving the utility vehicle without a driver;

wherein the electropneumatic parking brake system includes a bistable valve which is activatable in the autonomous operating mode and a monostable valve which, in the stable state, automatically initiates emergency braking when the valid autonomous control signal has not been applied, wherein the transfer module is coupled to the bistable valve to switch the bistable valve in the autonomous operating mode when the control of the utility vehicle is transferred from the driver to the control module, and wherein the control module is configured to transmit the valid autonomous control signal to the monostable valve to move the monostable valve into a non-stable state, which prevents the emergency braking of the utility vehicle.

7. A non-transitory computer readable medium having a computer program, which is executable by a processor, comprising:

a program code arrangement having program code for providing driverless operation of a utility vehicle in a limited area, by performing the following:

transferring control of the utility vehicle from a driver of the utility vehicle to a control module, wherein the utility vehicle allows an autonomous operating mode and includes an electropneumatic parking brake system configured to release the parking brake system when a valid autonomous control signal is present and to initiate automatic emergency braking when no valid autonomous control signal is applied;

outputting the valid autonomous control signal to the electropneumatic parking brake system; and moving the utility vehicle without a driver;

wherein the electropneumatic parking brake system includes a bistable valve which is activatable in the autonomous operating mode and a monostable valve which, in the stable state, automatically initiates emergency braking when the valid autonomous control signal has not been applied, wherein the transfer module is coupled to the bistable valve to switch the bistable valve in the autonomous operating mode when the control of the utility vehicle is transferred from the driver to the control module, and wherein the control module is configured to transmit the valid autonomous control signal to the monostable valve to move the monostable valve into a non-stable state, which prevents the emergency braking of the utility vehicle.

\* \* \* \* \*